United States Patent [19]

Stoll

[11] Patent Number: 5,648,856
[45] Date of Patent: Jul. 15, 1997

[54] METHOD FOR OPTICALLY FIXING HOLOGRAMS IN PHOTOREFRACTIVE MATERIALS AND A READ/WRITE MEMORY BASED THEREON

[75] Inventor: Harold M. Stoll, Rancho Palos Verdes, Calif.

[73] Assignee: Northrop Grumman Corporation, Los Angeles, Calif.

[21] Appl. No.: 419,322

[22] Filed: Apr. 10, 1995

[51] Int. Cl.$^6$ .................... G02B 1/02; G02B 5/00; G02B 1/04

[52] U.S. Cl. .................... 359/7; 359/24; 359/3

[58] Field of Search .................... 359/4, 76, 3, 900, 359/6, 24

[56] References Cited

U.S. PATENT DOCUMENTS

| 3,773,400 | 11/1973 | Amodei et al. | 359/7 |
|---|---|---|---|
| 3,873,179 | 3/1975 | Burke | 359/7 |
| 4,124,268 | 11/1978 | Micheron et al. | 359/6 |

OTHER PUBLICATIONS

Staebler D. L. et al. "Thermally fixed holograms in LiNbO$_3$" Ferroelectrics, vol. 3, (1971) p. 107.
Staebler D. L. et al. "Multiple Storage and Erasure of Fixed Holograms in Fe-doped LiNbO$_3$" Appl. Phys. Ltrs. vol 26, No. 4 (15 Feb. 1975) pp. 182–184.
Mott, N. F. et al., Electronic Processes in Ionic Crystals Oxford 1957 pp. 40–45.
von der Linde, D. et al., "Multiphoton photorefractive processes for optical storage in LiNbO$_3$" Appl. Phys. Ltrs. vol 25, No. 3 (1 Aug. 1974) pp. 155–157.
von der Linde, D., et al., "Optical storage using refractive index changes induced by two-step excitation" Journal of Appl. Phys. vol 47, No. 1 (1 Jan. 1976) pp. 217–220.
Amodei, J. J., et al. "Holographic Pattern Fixing in Electro-Optic Crystals" Appl. Phys. Ltrs. vol 18 No. 12 (15 Jun. 1971) pp. 540–542.

Klauer, S., et al., "Influence of H–D isotopic substitution on the protonic conductivity of LiNbO$_3$" Physical Review B, vol. 45 No. 6 (1 Feb. 92II) pp. 2786–2799.
Valley, G. C., et al., "Optimal properties of photorefractive materials for optical data processing" Optical Engineering vol. 22, No. 6 (Nov.–Dec. 1983) pp. 704–711.
Phillips, W., Burke, W.J., and Staebler, D.L., Final Report Contract N00019–76–C–0116 "Materials for Volume Phase Holography" (Dec. 1976) PRRL–76–CR–57 56 pages.

*Primary Examiner*—Jon W. Henry
*Attorney, Agent, or Firm*—Terry J. Anderson; Karl J. Hoch, Jr.

[57] ABSTRACT

A method and read/write memory based thereon for storing phase holograms in a photorefractive crystalline material in which electric-field-mobile positive ions are associated with certain sites within the material broadly characterized by first forming a halogram (light interference pattern) in the material in order to redistribute the electrons therein to cause variations of the electric fields which variations represent the halogram, and then illuminating the material with light of a frequency in an absorption band of the ionic bond and having sufficient energy to cause the positive ions to be redistributed to neutralize the electric field variations caused by the electrons, whereat said positive ions remain fixed. As applied to a specific crystalline material, Fe:LiNbO$_3$, having protons held in OH$^-$ bonds, a crystal of Fe:LiNbO$_3$ is exposed to a light interference pattern to record the same as an electronic space charge pattern or hologram in the volume of the crystal by photo-excitation of electrons trapped at Fe+2 sites. Afterwards, or at the same time, the crystal is exposed to light at a proton absorption band in order to optically liberate the protons from OH$^-$ bonds within the Fe:LiNbO$_3$ and, thereby, to neutralize the electronic pattern or hologram space charge and allow the protons to migrate and to create a proton space charge pattern which mirrors the electronic pattern or hologram and neutralizes the space charge patterns of the electrons. Thereafter, the protons remain fixed.

13 Claims, 2 Drawing Sheets

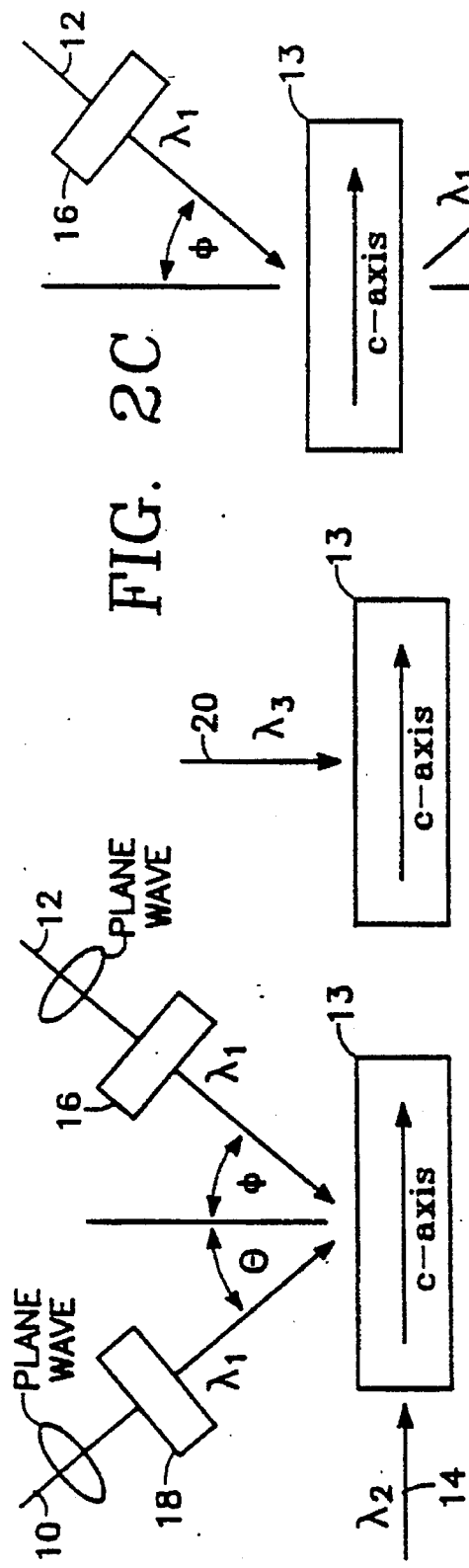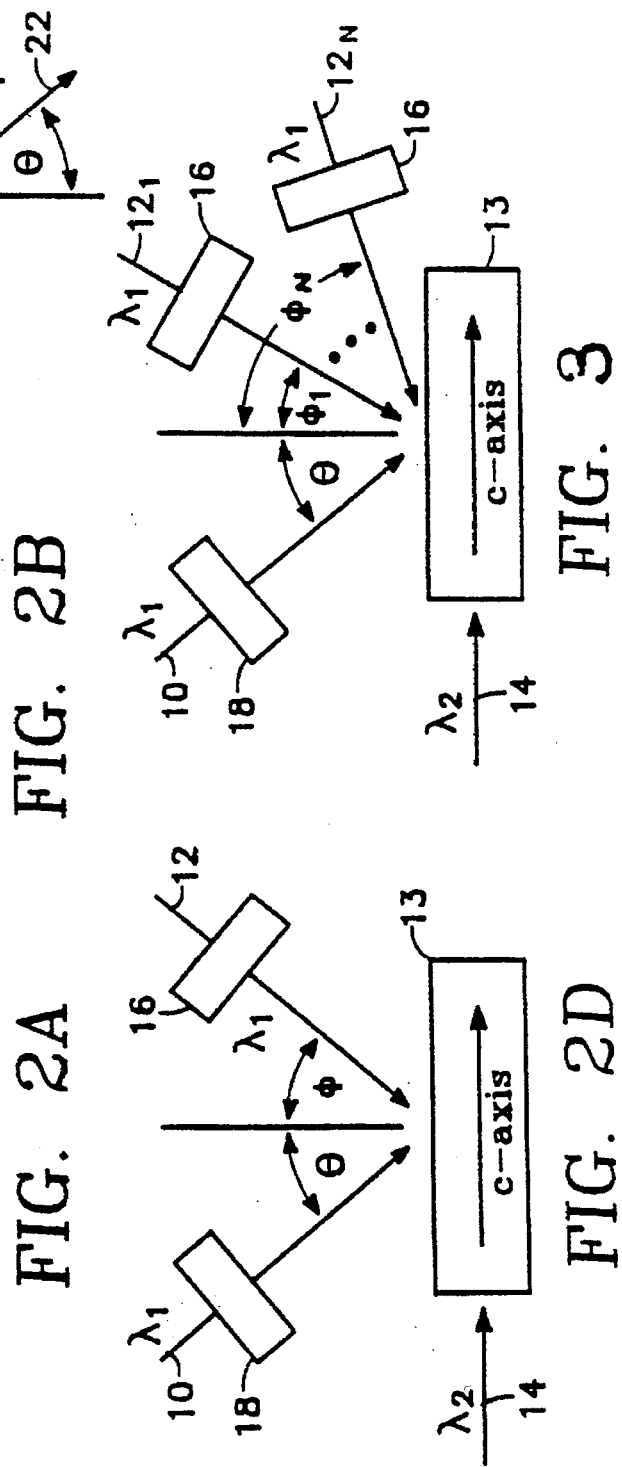

METHOD FOR OPTICALLY FIXING HOLOGRAMS IN PHOTOREFRACTIVE MATERIALS AND A READ/WRITE MEMORY BASED THEREON

FIELD OF THE INVENTION

This invention describes an optical method for fixing holograms in photorefractive materials and a read/write memory based on this optical method. The invention has particular application to the photorefractive material lithium niobate.

BACKGROUND OF THE INVENTION AND PRIOR ART

Photorefractive crystalline materials such as iron-doped lithium niobate ($Fe:LiNbO_3$) respond to exposure to light in such a way as to cause a charge redistribution which can later diffract incident light. Thus, if the initial exposure creates a hologram, the latter can be reconstructed and recovered.

To date, the utility of lithium niobate as a holographic data storage medium has been severely limited by the lack of a rapid, selective, and reversible storage (write) procedure which is compatible with non-destructive data recovery (read).

D. L. Staebler and J. J. Amodei ("Thermally fixed holograms in $LiNbO_3$," Ferroelectrics, 3, p. 107, 1971) demonstrated that holograms generated within $Fe:LiNbO_3$ could be thermally fixed by heating the $Fe:LiNbO_3$ to roughly 100° C. for at least 30 minutes after the holograms had been generated. While this technique is reversible (by heating the $Fe:LiNbO_3$ to greater than 170° C. for approximately 30 minutes) and does permit non-destructive data read out, it is slow, results in low holographic diffraction efficiency, and is non-selective (i.e., all holograms multiplexed within a given volume of $Fe:LiNbO_3$ are fixed and erased, en masse).

Subsequently, D. L. Staebler, W. J. Burke, W. Phillips and J. J. Amodei ("Multiple Storage and Erasure of Fixed Holograms in Fe-doped $LiNbO_3$," Applied Physics Letters, 26, p. 182, 1975) demonstrated that volume holograms generated within Fe: $LiNbO_3$ could be thermally fixed by heating the $Fe:LiNbO_3$ to approximately 160° C. while the holograms were being generated. While this technique resulted in high-diffraction efficiency holograms that could be non-destructively read-out, it necessitated an inconvenient physical rotation of the $Fe:LiNbO_3$ crystal during read-out in order to compensate for hologram read-out angles which changed slightly upon cooling the Fe: $LiNbO_3$ crystal to room temperature.

D. von der Linde, A. M. Glass and K. F. Rogers ("Multiphoton photorefractive processes for optical storage in $LiNbO_3$," Applied Physics Letters, 25, p. 155, 1974) describe a two-photon storage technique which is rapid (picosecond time scale), but which requires high-intensity laser beams ($\sim 10^9$ watts/cm$^2$) for storage and relatively low intensity laser beams for non-destructive read-out. Such picosecond, gigawatt laser pulses are difficult to obtain at repetition rates (10–1,000 Hz) necessitated by practical data storage systems and, furthermore, may cause damage to critical system components (e.g., acousto-optic beam deflectors used for hologram multiplexing and spatial light modulators used for entering holographic data). Moreover, the requirement to use a low-intensity laser beam to avoid destructive read-out at the second harmonic frequency inevitably leads to reduced output data transfer rates.

Finally, D. von der Linde, A. M. Glass and K. F. Rogers ("Optical storage using refractive index changes induced by two-step excitation," Journal of Applied Physics, 47, p. 217, 1976) describe a two-step holographic storage process involving chromium-doped $LiNbO_3$ which is, in principle, capable of non-destructive read (at the write wavelength) and selective optical erasure, and which requires peak storage laser beam intensities of only about $10^7$ watts/cm$^2$. This approach, however, yields relatively small holographic diffraction efficiencies (compared with $Fe:LiNbO_3$) which are not linear with storage exposure energy (important for retaining holographic dynamic range) and, most importantly, yields short storage times of only about 20 hours. Furthermore, this approach requires the use of specialized (Q-switched ruby and tunable dye) lasers which are complicated, unreliable, and expensive.

There is, therefore, a need for improved methods of fixing holograms in photorefractive storage media which will overcome the above limitations and disadvantages and, thereby, make possible practical read/write memories based thereon.

SUMMARY OF THE INVENTION

The present invention is predicated on a finding that there exists in $Fe:LiNbO_3$ a broad, polarization-sensitive optical absorption band, centered at about 1 µm, which corresponds to the liberation of protons from their oxygen bonds. In accordance with the present invention it is found that optically generated, electronic holograms can be optically fixed in $Fe:LiNbO_3$ by using radiation (not necessarily coherent) within this polarization-sensitive absorption band (roughly 0.85 µm to 1.6 µm) to optically excite and liberate protons from potential well traps, which protons then drift within the field generated by the electronic hologram to compensate and fix the latter.

In accordance with this invention, a method and read/write memory based thereon is disclosed by which phase holograms are stored and fixed in a photorefractive crystalline material, preferably $Fe:LiNbO_3$, having protons bound to oxygen atoms within the $LiNbO_3$ lattice. Holograms are stored (and data written) by exposing the $Fe:LiNbO_3$ to a light interference pattern formed by interfering a plane-wave reference beam and a data-bearing object beam, both beams of which have a wavelength suitable for photo-exciting electrons trapped at $Fe^{+2}$ sites within the $Fe:LiNbO_3$. The photo-excited electrons then become trapped at $Fe^{+3}$ sites within the $Fe:LiNbO_3$ and form a space-charge pattern, or hologram, which is identical spatially to the original interference pattern. Afterwards, or simultaneously, the crystal is exposed to light having a wavelength within the broad, proton absorption band. Optically excited protons then drift within the electric field of the electronic space-charge pattern and compensate the latter. The resulting compensated pattern is then exposed to light having a wavelength equal to or nearly equal to the wavelength of the light used to generate the original interference pattern, thereby causing the trapped electrons to become spatially homogeneous and the latent protonic grating to be developed or revealed. The latter represents a "fixed" grating which can be non-destructively read at the same optical wavelength used to write the original hologram.

The holographic writing technique described above may be extended to include angle-multiplexed holograms, wherein multiple holograms are written sequentially by incrementing the angle with which the reference beam interferes with the object beam within the $Fe:LiNbO_3$ crystal. As in the case of a single hologram, angle-multiplexed holograms may be compensated, developed, and, hence, fixed via protonic excitation either after all holograms have been recorded electronically or simultaneously with their recording. Moreover, having once stored a sequence of angle-multiplexed holograms, individual holograms may be completely or partially erased by phase-shifting the reference beam associated with the hologram in question by $\pi$ radians and simultaneously illuminating the Fe:LiNbO$_3$ with that part of the data-bearing object beam to be erased.

These and other features of the invention will become apparent from the following descriptions and claims when taken with the accompanying drawing, of which:

BRIEF DESCRIPTION OF THE DRAWINGS

FIGS. 2A–2D describe a read/write memory using Fe:LiNbO$_3$ as the storage medium in accordance with the present invention, in which: FIG. 2A shows simultaneous hologram (data) writing and fixing step; FIG. 2B shows the hologram development step; FIG. 2C shows the hologram (data) read step; and FIG. 2D shows the hologram (data) erasure step. $\lambda_1$ $\lambda_2$, and $\lambda_3$ are the wavelengths of the write, fixing, and development beams, respectively. Since neither the fixing nor the developing beams need be coherent or narrow band, $\lambda_2$ and $\lambda_3$ can represent center frequencies.

FIG. 3 shows how N holograms can be sequentially written and fixed using an angle-multiplexing technique.

DETAILED DESCRIPTION OF THE PREFERRED EMBODIMENT

Figure 1:
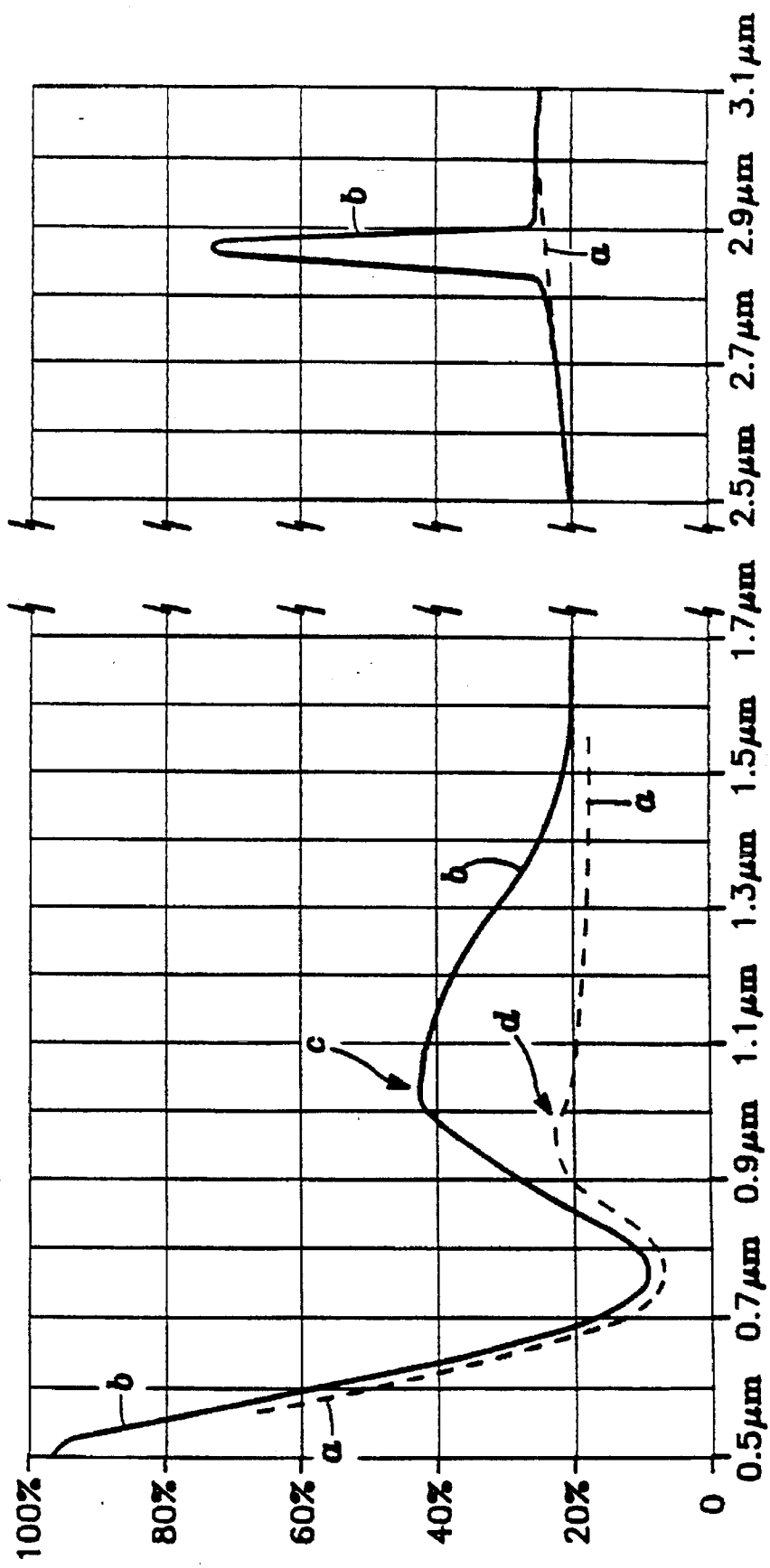
FIG. 1 shows transmittance spectra taken of Fe:LiNbO$_3$ (0.1 mole percent iron) containing interstitial hydrogen bound to oxygen atoms. In the graph labeled (a) the light is polarized parallel to the crystalline c-axis and in the graph labeled (b) the light is polarized perpendicular to the crystalline c-axis.

This invention describes a process for optically fixing holograms stored within iron-doped lithium niobate (Fe:LiNbO$_3$) which contains hydrogen ions (protons), and also describes an apparatus, based on this process, by which data may be holographically written, read, and erased within Fe:LiNbO$_3$.

Iron is introduced into the LiNbO$_3$ host during growth of the latter using a conventional Czochralski pulling technique. Subsequently, protons can be introduced in the Fe:LiNbO$_3$ using (as taught in S. Klauer, M. Wöhlecke, and S. Kapphan, "Influence of H-D isotopic substitution on the protonic conductivity of LiNbO$_3$," Physical Review B, 45, p. 2786, 1992) electric field or wet annealing techniques. Protons are believed to be the mobile species which compensate (and fix) optically generated, electronic holograms within Fe:LiNbO$_3$ (S. Klauer, et al). These protons are normally bound to oxygen atoms within the LiNbO$_3$, as revealed by a highly polarization-sensitive absorption band at 2.87 µm which corresponds to the fundamental vibration resonance of an OH$^-$ molecule (as modified slightly by crystal field effects within the LiNbO$_3$).

The energy required to free a proton (i.e., break the OH$^-$ bond) is inferred to be approximately 1.17 eV within Fe:LiNbO$_3$ (compared with a dissociation energy of approximately 4.2 eV for a free OH$^-$ ion). This activation energy was measured using thermal conductivity techniques by both Staebler et al. in 1975 and by Klauer et al. in 1992. The literature does not report any attempt to optically liberate the proton from its bound state within either LiNbO$_3$ or Fe:LiNbO$_3$.

FIG. 1 shows polarized transmittance spectra of Fe:LiNbO$_3$ taken from 0.5 µm to 3.1 µm. Graph (a) in FIG. 1 plots the transmittance for light polarized parallel to the Fe:LiNbO$_3$ c-axis and graph (b) in FIG. 1 plots the transmittance for light polarized perpendicular to the Fe:LiNbO$_3$ c-axis. The characteristic (and highly polarization-sensitive) OH$^-$ absorption band centered at 2.87 µm is clearly present in graph (b) and absent in graph (a). Also present in graph (b) is a broad absorption band (c) centered at approximately 1.15 µm, which appears to overlay a weaker background absorption band (d) evident in graph (a). This broad polarization-sensitive absorption band (the center of which corresponds closely to the thermally measured proton activation energy of 1.17 eV) is attributed to optical activation (or breaking) of the OH$^-$ bond within the Fe:LiNbO$_3$. Optically generated, electronic holograms can be optically fixed in Fe:LiNbO$_3$ by using radiation (not necessarily coherent) within this broad, polarization-sensitive absorption band (roughly 0.85 µm to 1.6 µm) to liberate protons, which then drift within the field generated by the electronic hologram to compensate the latter.

Optical fixing, as described here, of holograms stored within Fe:LiNbO$_3$ overcomes all of the shortcomings of the fixing techniques cited in the prior art and permits, for the first time, the building of a true, high-data-transfer-rate read/write memory in Fe:LiNbO$_3$.

FIGS. 2A–2D illustrate how the optical processes described herein can be used to realize a read/write memory in Fe:LiNbO$_3$. FIG. 2A illustrates hologram storage (data writing); FIG. 2B hologram (data) development; FIG. 2C non-destructive hologram recovery (data reading); and FIG. 2D selective hologram (data) erasure.

Referring to FIG. 2A, mutually coherent object and reference laser beams 10 and 12, interfere within a crystal 13 of Fe:LiNbO$_3$ to form an electronic phase hologram. Simultaneously, a fixing beam 14 (of wavelength $\lambda_2$) propagates (preferentially) along the Fe:LiNbO$_3$ crystal's c-axis and excites protons quiescently bound to oxygen atoms within the Fe:LiNbO$_3$. Excited protons drift within the electric field generated by the electronic phase hologram and continuously and simultaneously compensate the electronic hologram. The result is a compensated (charge-wise) hologram which temporarily has no diffracting power. Wavelength $\lambda_1$ may lie anywhere within the Fe$^{2+}$ absorption band of Fe:LiNbO$_3$ (approximately 0.40 µm to 0.55 µm) and $\lambda_2$ may lie anywhere within the OH$^-$ absorption band (approximately 0.85 µm to 1.6 µm).

The source (not shown) of optical radiation (for beam 14) at wavelength $\lambda_2$ is preferably a Nd:YAG laser operated at 1.06 µm. A portion of the 1.06 µm output of the Nd:YAG laser is doubled to 532 nm and, preferably, serves as the source of optical radiation at $\lambda_1$ (for beams 10 and 12).

Also referring to FIG. 2A, the presence of an optical phase shifter 16 is noted in the reference beam path. During the storage or writing of a hologram, this phase shifter introduces zero phase shift into the reference beam; during complete or partial erasure of a hologram (as will be described below), it introduces a pi ($\pi$) phase shift into the reference beam.

The phase shifter is preferably an electro-optic device, incorporating, for example undoped lithium niobate or potassium di-hydrogen phosphate (KD*P) as the electro-optic medium. The spatial light modulator (SLM) 18 shown in the object beam path in FIG. 2A is used to encode information (data) within the stored hologram. Typically, the SLM comprises a two-dimensional array of optical switches, which, when illuminated by a plane wave, converts information read into these switches into amplitude modulations of the plane wave. SLM switches (array elements) can be liquid crystals, metallic membranes, magneto-optic modulators, or any similar devices capable of modulating optical radiation.

Optimal hologram pagewriting (i.e., maximum hologram diffraction efficiency) occurs when the dielectric relaxation time, $\tau_p$, of the protonic charge generated by the fixing beam equals the writing time constant of the electronic phase hologram. The protonic dielectric relaxation time is given by:

$$\tau_p = \frac{\epsilon_0 \epsilon_c}{\sigma_p}, \quad (1)$$

where $\epsilon_0 = 8.85 \times 10^{-12}$ farads per volt per meter, $\epsilon_c$ is the static dielectric constant of $LiNbO_3$ along the latter's c-axis (=28.5), and $\sigma_p$ is the protonic conductivity induced by the fixing beam:

$$\sigma_p = \left[ \frac{n_p e^2 F^2}{k_B T} \right] \cdot \frac{I_{p0} \sigma_H}{h \nu_f}, \quad (2)$$

where $n_p$ is the concentration of protons within the $Fe:LiNbO_3$ crystal, e (=$1.60219 \times 10^{-19}$ coulombs) is the protonic charge, F is the mean jumping distance for bound protons, $k_B$ (=$1.38062 \times 10^{-23}$ joules per degree Kelvin) is Boltzmann's constant, T is the crystal temperature in degrees Kelvin, $I_{p0}$ is the intensity (watts/cm$^2$) of the fixing beam, $\sigma_H$ is the protonic absorption cross section, h (=$6.626 \times 10^{-34}$) is Planck's constant ($\div 2\pi$), and $\nu_f$ is the optical frequency (in Hertz) of the fixing beam.

The writing time constant of the electronic phase grating is approximately given by (see, for example, G. C. Valley and M. B. Klein, "Optimal properties of photorefractive materials for optical data processing," Optical Engineering, 22, p. 704, 1983):

$$\tau_e = \frac{\epsilon_0 \epsilon_c}{\sigma_e} = \frac{\epsilon_0 \epsilon_c}{n_e \cdot e \cdot \mu_e}, \quad (3)$$

where $n_e$ is the concentration of electrons liberated from $Fe^{+2}$ traps within the $Fe:LiNbO_3$, e is the electronic charge, and $\mu_e$ is the electronic mobility.

$n_e$ is given by:

$$n_e = \frac{\sigma_e I_{e0}}{\gamma_R} \cdot R, \quad (4)$$

where $\sigma_e$ is the electronic absorption cross section, $I_{e0}$ is the peak intensity (watts/cm$^2$) of the interference pattern generated by the object and reference beams, $\gamma_R$ is the recombination rate coefficient of the electrons, and R is the ratio of $Fe^{+2}$ to $Fe^{+3}$ ions within the $LiNbO_3$.

Referring to FIG. 2B, the compensated (and, hence, non-diffracting) hologram generated during the writing step is revealed or developed by illuminating the crystal by a third beam 20 of wavelength $\lambda_3$. The function of this beam is to liberate electrons from $Fe^{3+}$ traps (to which the electrons have diffused during generation of the electronic phase grating) and to homogeneously redistribute them throughout the $Fe:LiNbO_3$ crystal, thereby revealing the protonic grating which remains stationary under illumination by the developing beam. The wavelength, $\lambda_3$, of the developing beam is typically approximately equal to $\lambda_1$. The developing beam need not be a laser, but can be some broad-band source of radiation centered at $\lambda_3$. This step is included because it is usually mentioned and implied as necessary in the literature. In fact, it is believed that it may not be necessary, since the act of reading a hologram, (see description of FIG. 2c, below), will, in and of itself, redistribute the electrons so that the hologram is developed and can be read.

Referring to FIG. 2C, the protonic grating (revealed by the developing beam of wavelength $\lambda_3$) is read by illuminating the $Fe:LiNbO_3$ crystal 13 at angle $\phi$ by the reference beam and observing the reconstructed object beam 22 which emerges from the crystal at angle $\theta$. During this step phase shifter 16 introduces zero phase shift into the reference beam.

Referring to FIG. 2D, an entire hologram (page of data) can be erased by exposing the $Fe:LiNbO_3$ crystal 13 to object and reference laser beams 10 and 12, incident at the same hologram write angles, but with a pi ($\pi$) phase shift impressed on reference beam 12. Similarly, a portion of a hologram can be erased by exposing the crystal to the reference beam (incident at angle $\phi$ and shifted by $\pi$ radians), and that potion of the original page of data (incident on the crystal at angle $\theta$) to be erased. Such complete or selective erasure of a hologram is possible because the $\pi$ phase shift introduced into the reference beam effectively creates both protonic and electronic phase holograms which are 180° out of phase with the originally formed holograms, and which, thereby, through superposition, exactly cancel that portion of the hologram to be erased.

Referring to FIG. 3, multiple, angle-multiplexed page holograms can be written, read, and erased in any order by sequentially interfering object beams (spatially modulated by different data records) incident on the $Fe:LiNbO_3$ crystal 13 at angle $\theta$ with plane-wave reference beams $12_1, \ldots 12_N$ incident on the crystal at angles $\phi_1, \phi_2, \phi_3, \ldots \phi_N$, where N is the total number of holographic pages written.

Finally, it is noted that the proposed optical fixing process can be made to occur on microsecond time scales by using short (approximately 5 nanoseconds long), high-peak-power (approximately $10^6$ watts/cm$^2$) laser pulses of the type which can be routinely obtained from a Q-switched Nd:YAG laser. As an example, for $n_p = 10^{24}$ m$^{-3}$, F=$2 \times 10^{-9}$ m, T=300° K., $\sigma_H = 1.51 \times 10^{-19}$ cm$^2$, and $I_{po} = 5 \times 10^6$ watts/cm$^2$, Equations (1) and (2) yield $\tau_p = 2.5$ μsec.

What is claimed is:

1. A method for optically fixing holograms in photorefractive crystalline materials comprising the steps of:

providing a crystal of photorefractive material in which holograms can be created by the redistribution of electrons and fixed by the redistribution of positive ions bound within said crystal, forming a hologram (light interference pattern) in said material in which electrons are redistributed therein and cause variations of the electric fields in said crystal defining said hologram, illuminating the material with light of a frequency in an absorption band of the ionic bond and having sufficient energy to cause the positive ions to be redistributed into new locations to neutralize the electric field variations caused by the electrons, whereat said positive ions remain fixed, forming a protonic grating in response to the electric fields.

2. The method of claim 1 in which said positive ions are protons.

3. The method of claim 1 further in which said forming step includes illuminating said crystal with a reference beam at a first angle, and simultaneously illuminating said crystal with an object beam containing information at a second angle, and further including the step of subsequently illuminating the material with said reference beam at said first angle and at the same frequency by which said hologram was written to create a reconstructed beam containing said information.

4. The method of claim 1 further in which said forming step includes illuminating said crystal with a reference beam at a first angle, and simultaneously illuminating said crystal with an object beam containing information at a second angle, and further including the step of subsequently illuminating the material with said same reference beam after imposing a 180 degree phase change thereon and at said first angle and at the same frequency by which said hologram was written and simultaneously again illuminating said crystal with object beam to selectively erase said hologram containing said first written information.

5. A method for optically fixing holograms in photorefractive crystalline materials comprising the steps of:

a. providing a crystal of photorefractive material in which holograms can be created by the redistribution of electrons and fixed by the redistribution of ions (protons) ionically bound within said crystal, b. illuminating said crystal with a reference beam at a first angle, and simultaneously illuminating said crystal with an object beam containing information at a second angle, to form a first hologram (light interference pattern) in said material in which electrons are redistributed therein and cause variations of the electric fields in said crystal defining said hologram, c. illuminating the material with light of a frequency in an absorption band of the ionic bond and having sufficient energy to cause the ions to be redistributed into new locations to neutralize the electric field variations caused by the electrons to fix thereby said first hologram in the form of a first protonic grating, d. repeating said illuminating steps of subparagraph b. with said reference beam shifted to a new angle different from said first angle, and with an object beam at the same angle and containing different information to form a second hologram (light interference pattern) in said material in which electrons are redistributed therein and cause variations of the electric fields in said crystal representing said second hologram, e. again illuminating the material with light of a frequency in an absorption band of the ionic bond and having sufficient energy to cause the ions to be redistributed into new locations to neutralize the electric field variations caused by the electrons to thereby fix said second hologram in the form of a second protonic grating, and f. continuing the above steps to write and fix a plurality of angularly multiplexed holograms into said crystal.

6. The method of claim 5 further including the step of subsequently illuminating the material with said reference beam at said first angle and at the same frequency and angle by which one of said holograms was written to selectively reconstruct an object beam containing the information in said one hologram.

7. In a method for storing phase holograms in a crystal of iron-doped lithium niobate ($Fe:LiNbO_3$) in which holograms are written by the redistribution of electric charge and fixed by the redistribution of protons, the steps of:

forming a hologram by exposing the crystal to a light interference patters to record the same as an electronic space charge pattern or hologram in the volume of the crystal by photo-excitation of electrons trapped at $Fe+2$ sites, further exposing the crystal to light at the proton absorption band to neutralize said electronic pattern or hologram space charge by optically liberating the protons from OH bonds within the $Fe:LiNbO_3$, which allows the protons to migrate to create a protonic grating which mirrors said electronic pattern or hologram and neutralizes the space charge patterns of the electrons, said protonic grating thereafter remaining fixed.

8. The method of claim 7 further in which said forming step includes illuminating said crystal with a reference beam at a first angle, and simultaneously illuminating said crystal with an object beam containing information at a second angle, and further including the step of subsequently illuminating the material with said reference beam at said first angle and at the same frequency by which said hologram was written to create a re-constructed object beam containing said information.

9. The method of claim 8 further in which said forming step includes illuminating said crystal with a reference beam at a first angle, and simultaneously illuminating said crystal with an object beam containing information at a second angle and further including the step of subsequently illuminating the material with said same reference beam after imposing a 180° phase change thereon and at said first angle and at the same frequency by which said hologram was written and simultaneously again illuminating said crystal with object beam to selectively erase said hologram containing said first written information.

10. A method for optically fixing holograms in photorefractive crystalline materials comprising the steps of:

a. providing a crystal of photorefractive $Fe:LiNbO_3$ in which holograms can be created by the redistribution of electrons and fixed by the redistribution of protons ionically bound within said crystal, b. illuminating said crystal with a reference beam at a first angle, and simultaneously illuminating said crystal with an object beam containing information at a second angle, to form a first hologram (light interference pattern) in said material in which electrons are redistributed therein and cause variations of the electric fields in said crystal representing said hologram, c. illuminating the material with light of a frequency in an absorption band of the ionic bond of said protons and having sufficient energy to cause the protons to be redistributed into new locations to neutralize the electric field variations caused by the electrons to fix thereby said first hologram in the form of a first protonic grating, d. repeating said illuminating steps of subparagraph b. with said reference shifted to a new angle different from said first angle, and with an object beam at the same or a different angle and containing different information to form a second hologram (light interference pattern) in said material in which electrons are redistributed therein and cause variations of the electric fields in said crystal representing said second hologram in the form of a second protonic grating, e. again illuminating the material with light of a frequency in an absorption band of the ionic bond of said protons and having sufficient energy to cause the protons to be redistributed into new locations to neutralize the electric field variations caused by the electrons to thereby fix said second hologram, and f. continuing the above steps to write and fix a plurality of angularly multiplexed holograms into said crystal.

11. The method of claim 10 further including the step of subsequently illuminating the material with said reference beam at the same frequency and angle by which one of said holograms was written to selectively create a re-constructed object beam containing the information from said one hologram.

12. A holographic memory for optically storing holograms in photorefractive crystalline materials comprising:

a crystal (Fe:LiNbO$_3$) of photorefractive material in which holograms can be created by the redistribution of electrons and fixed by the redistribution of ions, means for forming a hologram by interfering an input beam having information impressed thereon with a plane-wave reference beam in said material in order to redistribute the electrons therein and thereby form spatial charge density variations of the electric fields in said crystal representing said hologram, means for illuminating the material with light of a frequency in an absorption band of the ionic bond and having sufficient energy to cause the ions to be redistributed to neutralize the electric field charge density variations of the electrons, said ions thereafter remaining fixed as an ionic grating, means for illuminating said neutralized electronic/ionic hologram with a light beam which is mutually incoherent with said information beam and reference beams and which is of a frequency sufficient to liberate the electrons from their redistributed sites in order to create a spatially homogeneous electronic distribution within the crystal and thereby leave said ionic grating accessible for reading, and means for illuminating said memory with a read reference beam for interacting with the charge field of said ions in order to recover said information in said input beam stored in said ionic grating within said hologram.

13. A holographic memory for storing phase holograms containing information in photorefractive material which holograms are written by the redistribution of electric charges, comprising:

a photorefractive crystal of Fe:LiNbO$_3$ in which holograms can be created by the redistribution of electrons and fixed by the redistribution of protons, means for exposing the crystal to light interference pattern to record the hologram as a space charge pattern in the volume of the crystal by photo-excitation of electrons trapped at Fe$^{+2}$ sites, means for exposing the crystal to light at the proton absorption band to neutralize said space charge by optically liberating the protons from the OH bond with LiNbO$_3$ which allows the protons to migrate to create a proton space charge pattern corresponding to said hologram and to neutralize the space charge patterns of the electrons, whereat said proton space charge patterns remain fixed, and means for illuminating said memory with a read beam for interacting with the protonic space charge patterns to recover the information in said input beam by creating a reconstructed object beam containing said information.

* * * * *